(12) United States Patent
Fujita et al.

(10) Patent No.: US 10,883,513 B2
(45) Date of Patent: Jan. 5, 2021

(54) IMPELLER, ROTARY MACHINE, AND TURBOCHARGER

(71) Applicant: MITSUBISHI HEAVY INDUSTRIES ENGINE & TURBOCHARGER, LTD., Sagamihara (JP)

(72) Inventors: Yutaka Fujita, Tokyo (JP); Tadashi Kanzaka, Tokyo (JP); Hiroaki Yoshizawa, Tokyo (JP)

(73) Assignee: MITSUBISHI HEAVY INDUSTRIES ENGINE & TURBOCHARGER, LTD., Sagamihara (JP)

(*) Notice: Subject to any disclaimer, the term of this patent is extended or adjusted under 35 U.S.C. 154(b) by 122 days.

(21) Appl. No.: 16/088,558

(22) PCT Filed: Mar. 30, 2016

(86) PCT No.: PCT/JP2016/060456
§ 371 (c)(1),
(2) Date: Oct. 31, 2018

(87) PCT Pub. No.: WO2017/168642
PCT Pub. Date: Oct. 5, 2017

(65) Prior Publication Data
US 2019/0113048 A1    Apr. 18, 2019

(51) Int. Cl.
*F04D 29/26*  (2006.01)
*F04D 29/28*  (2006.01)
(Continued)

(52) U.S. Cl.
CPC ........... *F04D 29/263* (2013.01); *F03D 1/065* (2013.01); *F03D 1/0625* (2013.01);
(Continued)

(58) Field of Classification Search
CPC .. F04D 29/22; F04D 29/2216; F04D 29/2222; F04D 29/2261; F04D 29/2266;
(Continued)

(56) References Cited

U.S. PATENT DOCUMENTS

| 5,310,310 A | 5/1994 | Nakatsukasa et al. |
| 2005/0111971 A1* | 5/2005 | Fukizawa ............... F04D 25/04 415/204 |

(Continued)

FOREIGN PATENT DOCUMENTS

| CN | 204312394 U | 5/2015 |
| DE | 102012022647 A1 | 5/2014 |

(Continued)

OTHER PUBLICATIONS

Written Opinion of the International Searching Authority and International Search Report (forms PCT/ISA/237 and PCT/ISA/210), dated Jun. 21, 2016, for International Application No. PCT/JP2016/060456, with English translations.

*Primary Examiner* — Bryan M Lettman
(74) *Attorney, Agent, or Firm* — Birch, Stewart, Kolasch & Birch, LLP

(57) ABSTRACT

This compressor wheel (3) is provided with a disc (22) which is formed in a disc shape and provided to be rotatable around a central axis (C); and a plurality of blades (23) provided on a disc surface (22f) facing a first side in the central axis (C) direction with an interval in a circumferential direction around the central axis (C). A rear surface (22r) of the disc (22) facing a second side in the central axis (C) direction has a convex curved surface (25) which is convex toward the second side in the central axis (C) direction at least part of a center portion of the disc (22).

8 Claims, 3 Drawing Sheets

(51) Int. Cl.
*F03D 1/06* (2006.01)
*F04D 29/22* (2006.01)
*F04D 25/04* (2006.01)

(52) U.S. Cl.
CPC ........... *F03D 1/0691* (2013.01); *F04D 25/04* (2013.01); *F04D 29/2216* (2013.01); *F04D 29/2222* (2013.01); *F04D 29/2261* (2013.01); *F04D 29/266* (2013.01); *F04D 29/284* (2013.01); *F05D 2220/40* (2013.01); *F05D 2250/711* (2013.01); *F05D 2260/941* (2013.01)

(58) Field of Classification Search
CPC ...... F04D 29/28; F04D 29/284; F04D 29/263; F04D 29/266; F04D 25/04; F03D 1/0691; F03D 1/065; F03D 1/0625; F05D 2220/40; F05D 2260/941; F05D 2250/711
See application file for complete search history.

(56) References Cited

U.S. PATENT DOCUMENTS

| | | |
|---|---|---|
| 2008/0229742 A1 | 9/2008 | Renaud et al. |
| 2011/0064583 A1* | 3/2011 | Billotey ................. F01D 5/141 |
| | | 416/234 |
| 2017/0009780 A1 | 1/2017 | Yano et al. |

FOREIGN PATENT DOCUMENTS

| | | |
|---|---|---|
| EP | 0 442 070 A1 | 8/1991 |
| EP | 2 918 849 A1 | 9/2015 |
| JP | 55-119395 U | 8/1980 |
| JP | 5-180195 A | 7/1993 |
| JP | 11-270491 A | 10/1999 |
| JP | 2002-47944 A | 2/2002 |
| JP | 2008-163760 A | 7/2008 |
| JP | 2011-122538 A | 6/2011 |
| JP | 2014-118833 A | 6/2014 |
| WO | WO 2015/128958 A1 | 9/2015 |

* cited by examiner

IMPELLER, ROTARY MACHINE, AND TURBOCHARGER

FIELD OF THE INVENTION

The present invention relates to an impeller, a rotary machine, and a turbocharger.

BACKGROUND ART

A compressor wheel of a turbocharger often integrally includes a disc fixed to a rotating shaft, and a plurality of blades provided on a surface of the disc on one side in a central axis direction of the rotating shaft. In such a turbocharger, a rotation speed of the compressor wheel is also increased as performance thereof is improved.

When the compressor wheel rotates, centrifugal stress due to a weight of the disc acts. In order to reduce the centrifugal stress, it has been performed to make an inner circumferential side of the disc thicker in the central axis direction in order to secure rigidity while minimizing a mass of an outer circumferential portion of the disc by making an outer circumferential side of the disc thinner in the central axis direction.

For example, Patent Document 1 discloses a configuration which reduces the centrifugal stress of the disc by providing a taper on a rear surface of the outer circumferential portion of the disc in the radial direction (on a side opposite to the surface on which the blades are provided).

CITATION LIST

Patent Document

Patent Document 1

Japanese Unexamined Patent Application, First Publication No. H11-270491

SUMMARY OF INVENTION

Technical Problem

However, as the rotation speed of the compressor wheel is increased, the influence of the stress acting on the disc is increased. For example, when a member such as a collar is provided on a rear surface of the compressor wheel to position the compressor wheel in the central axis direction, stress may occur on the rear surface of the compressor wheel due to contact with this member. On the other hand, when the disc is unnecessarily thickened in the central axis direction to increase strength, the influence of the centrifugal stress as described above increases.

An object of the present invention is to provide an impeller, a rotary machine, and a turbocharger capable of reducing stress on a rear surface of a disc and improving reliability.

Solution to Problem

According to a first aspect of the present invention, an impeller includes a disc formed in a disc shape and provided to be rotatable around a central axis, and a plurality of blades provided on a disc surface facing a first side in a central axis direction at intervals in a circumferential direction around the central axis. A rear surface of the disc facing a second side in the central axis direction has a convex curved surface which is convex toward the second side in the central axis direction at least a part of a center portion of the disc.

According to such a configuration, when the convex curved surface is formed at at least the center portion of the rear surface of the disc of the impeller, a large thickness of the disc in the radial direction can be ensured at the portion on which the convex curved surface is formed. Therefore, strength of the disc can be enhanced.

Further, when other components collide with the rear surface of the disc, it is possible to reduce a contact area with other components and to prevent local stress concentration at portions in contact with other components.

According to a second aspect of the present invention, in the first aspect, an outer circumferential convex curved surface which is convex toward the second side in the central axis direction and is formed with a curvature different from that of the convex curved surface may be continuously formed on an outer side of the convex curved surface in a radial direction.

In this way, the thickness of the outer circumferential portion of the disc in the central axis direction is minimized by continuously forming the outer circumferential convex curved surface on the outer side of the convex curved surface in the radial direction, and a mass of the outer circumferential portion of the disc is minimized. Therefore, it is possible to minimize centrifugal stress due to a weight of the disc.

According to a third aspect of the present invention, in the first aspect, a concave curved surface which is concave toward the second side in the central axial direction may be continuously formed on an outer side of the convex curved surface in a radial direction.

In this way, a thickness of the outer circumferential portion of the disk in the central axis direction is minimized, and the mass of the outer circumferential portion of the disk is minimized. As a result, it is possible to minimize the centrifugal stress due to the weight of the disc.

According to a fourth aspect of the present invention, in the first aspect, a tapered surface which extends in a tangential direction continuously with an outer circumferential end of the convex curved surface may be formed on an outer side of the convex curved surface in a radial direction.

In this way, the thickness of the outer circumferential portion of the disk in the central axis direction is minimized, and the mass of the outer circumferential portion of the disk is minimized. As a result, it is possible to minimize the centrifugal stress due to the weight of the disc.

According to a fifth aspect of the present invention, a rotary machine includes a rotating shaft which extends along a central axis, an impeller according to any one of the first to fourth aspects which is provided on the rotating shaft, and a collar which is provided on the rotating shaft and collides with the convex curved surface of the rear surface of the impeller.

According to such a configuration, when the convex curved surface is formed at at least the center portion of the rear surface of the disc of the impeller, a large thickness of the disc in the radial direction can be ensured at the portion on which the convex curved surface is formed. Therefore, the strength of the disc can be enhanced.

Further, it is possible to reduce a contact area with the collar colliding with the rear surface of the disc and to prevent the local stress concentration at a contact portion with the collar.

According to a sixth aspect of the present invention, a turbocharger includes a rotating shaft which extends along a central axis, a turbine wheel provided on a first end side of the rotating shaft, and a compressor wheel provided on a second end side of the rotating shaft, the compressor wheel configured with the impeller according to the first to fourth aspects.

Therefore, when the convex curved surface is formed at least the center portion of the rear surface of the disc of the impeller forming a compressor wheel, a large thickness of the disc in the radial direction can be ensured at the portion on which the convex curved surface is formed. Thus, the strength of the disc can be enhanced.

According to a seventh aspect of the present invention, the turbocharger may further include a collar which is provided on the rotating shaft and collides with the convex curved surface of the rear surface of the impeller.

Therefore, it is possible to reduce the contact area with the collar colliding with the rear surface of the disc and to prevent the local stress concentration at the contact portion with the collar.

Advantageous Effects of Invention

According to the above-described impeller, rotary machine and turbocharger, it is possible to reduce stress on a rear surface of a disc and improve reliability.

DESCRIPTION OF EMBODIMENTS

An impeller, a rotary machine and a turbocharger according to an embodiment of the present invention will be described with reference to the drawings.

Figure 1:
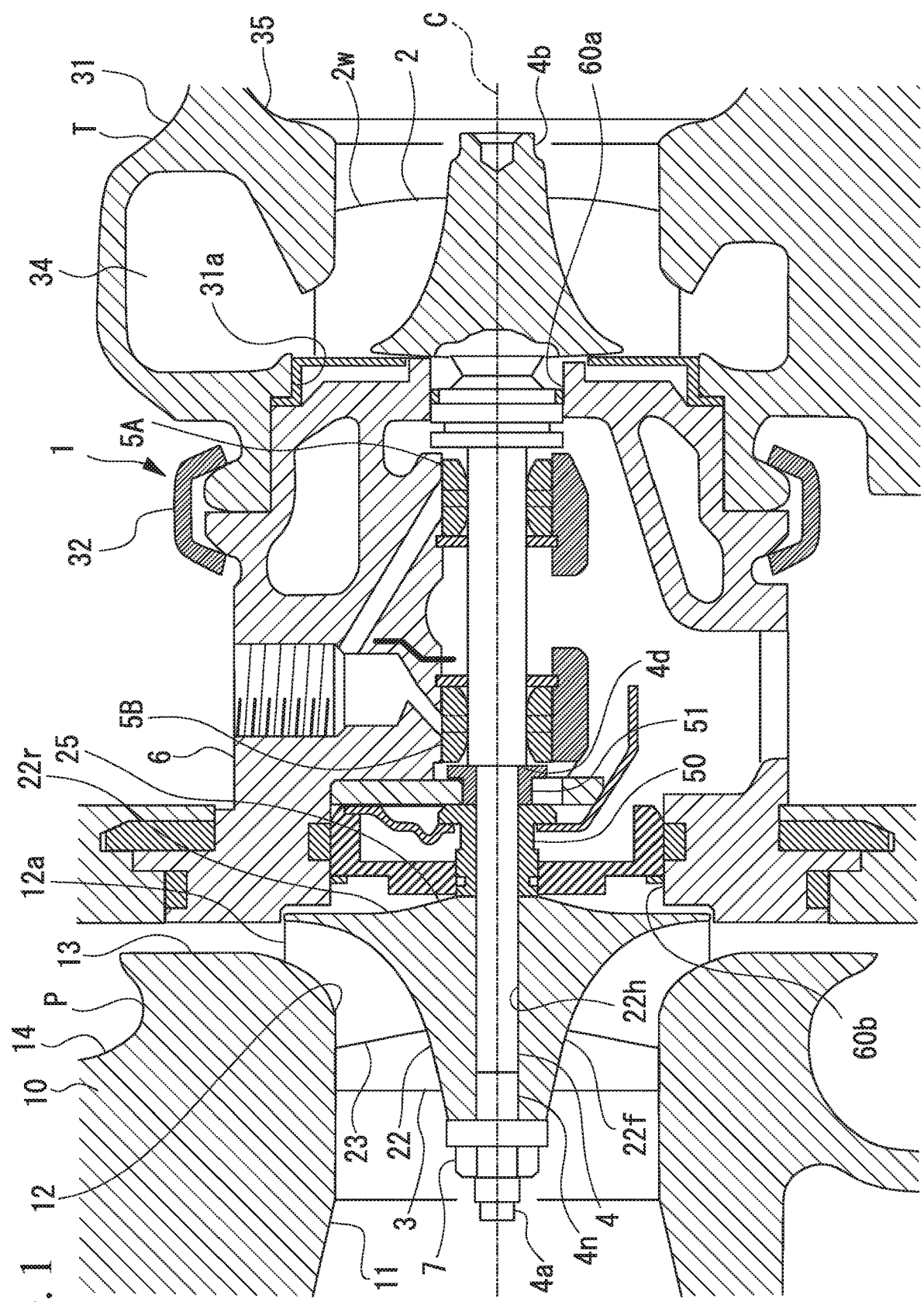
FIG. 1 is a cross-sectional view of a turbocharger in an embodiment of the present invention.

FIG. 1 is a cross-sectional view of a turbocharger in an embodiment of the present invention.

As shown in FIG. 1, a turbocharger (a rotary machine) 1 includes a turbine wheel 2, a compressor wheel (an impeller) 3, a rotating shaft 4, bearings 5A and 5B, and a bearing housing 6. For example, the turbocharger 1 is mounted in an automobile or the like as an auxiliary machine of an engine in such a posture that the rotating shaft 4 extends in a horizontal direction. Here, the alternate long and short dash line shown in FIG. 1 indicates a central axis C of the rotating shaft 4.

The bearing housing 6 is supported by a vehicle body or the like via a bracket (not shown), a compressor P, a turbine T, and so on. The bearing housing 6 has an opening 60b on one end side thereof and an opening 60a on the other end side thereof. The rotating shaft 4 is supported by the bearings 5A and 5B held by the bearing housing 6 to be rotatable around the central axis C. A first end 4a and a second end 4b of the rotating shaft 4 protrude to the outside of the bearing housing 6 through the openings 60a and 60b. That is, a part of the rotating shaft 4 in a longitudinal direction along the central axis C is accommodated in the bearing housing 6.

The turbine T is provided on the second end 4b side of the bearing housing 6. The turbine T includes a turbine wheel 2 and a turbine housing 31 which accommodates the turbine wheel 2.

The turbine wheel 2 is provided integrally with the second end 4b of the rotating shaft 4 and rotates around the central axis C integrally with the rotating shaft 4. The turbine wheel 2 has a plurality of turbine blades 2w in a circumferential direction.

The turbine housing 31 is mounted on one end side of the bearing housing 6 via a mounting fixture 32. The turbine housing 31 has an opening 31a at a position facing the bearing housing 6. The turbine wheel 2 is accommodated in the opening 31a.

The turbine housing 31 includes a gas introduction portion (not shown), a scroll flow path 34, and an exhaust portion 35.

The gas introduction portion (not shown) delivers some of exhaust gas discharged from the engine (not shown) into the turbine housing 31.

The scroll flow path 34 is continuously formed in the circumferential direction to be connected to the gas introduction portion (not shown) and to surround an outer circumferential side of the turbine wheel 2. The scroll flow path 34 is provided so that at least part thereof in the circumferential direction communicates with an outer circumferential portion of the turbine wheel 2 and forms a flow path through which the exhaust gas for rotationally driving the turbine wheel 2 flows.

The exhaust gas flowing in from the gas introduction portion 33 flows on the outer circumferential side of the turbine wheel 2 along the scroll flow path 34 in the circumferential direction. The exhaust gas flowing in the circumferential direction in this way strikes the turbine blades 2w of the turbine wheel 2, and thus the turbine wheel 2 is rotationally driven. Further, as the exhaust gas strikes the turbine blades 2w on the outer circumferential side of the turbine wheel 2, a direction of a flow thereof is changed. The exhaust gas of which the direction of the flow is changed by the turbine blades 2w is discharged from an inner circumferential side of the turbine wheel 2 into the exhaust portion 35.

The compressor P is provided on the first end 4a side of the bearing housing 6. The compressor P includes a compressor wheel 3 and a compressor casing 10.

The compressor wheel 3 includes a disc 22 and a blade 23.

The disc 22 has a disc shape extending outward in a radial direction, and an insertion hole 22h through which the rotating shaft 4 is inserted is formed in a center portion thereof. The disc 22 has a predetermined length in the central axis C direction and is fixed to the first end 4a of the rotating shaft 4. The disc 22 has a disc surface (surface) 22f on a first side (a left side in FIG. 1) in the central axis C direction. The disc surface 22f is formed by a curved surface which is gradually directed outward in the radial direction from a wheel inlet flow path 11 side on the first side in the central axis C direction to the bearing housing 6 side on the second side in the central axis C direction.

A plurality of blades 23 are provided on the disc surface 22f at intervals in the circumferential direction around the central axis C.

A thrust collar (collar) 50 is provided on the bearing housing 6 side of the compressor wheel 3. The thrust collar 50 has a cylindrical shape, and the rotating shaft 4 is inserted therethrough. As the thrust collar 50 collides with a stepped portion 4d formed on the rotating shaft 4 via an annular spacer 51, movement thereof toward the turbine wheel 2 in the central axis C direction is restricted.

As a nut 7 is screwed onto a threaded portion 4n formed at the first end 4a of the rotating shaft 4, the compressor wheel 3 being sandwiched between the thrust collar 50 and the nut 7 and coupled to the rotating shaft 4.

When the turbine wheel 2 rotates, such a compressor wheel 3 rotates around the central axis C integrally with the rotating shaft 4. The compressor wheel 3 raises a pressure and a temperature of air (intake air) with the blades 23 and delivers it outward in the radial direction.

The compressor casing 10 forms the wheel inlet flow path 11, a wheel flow path 12, a diffuser 13, and a scroll 14.

For example, the wheel inlet flow path 11 is formed between an intake pipe (not shown) extending from an air cleaner box or the like and the wheel flow path 12.

The wheel flow path 12 is formed by a space for accommodating the compressor wheel 3. This wheel flow path 12 forms a flow path, through which compressed air flows, between the wheel flow path 12 and the disc 22 of the compressor wheel 3.

The diffuser 13 extends outward from an outermost circumferential portion 12a of the wheel flow path 12 in the radial direction centering on the central axis C. The diffuser 13 converts, for example, kinetic energy of the air compressed by the compressor wheel 3 into pressure energy. The diffuser 13 connects the wheel inlet flow path 11 with the scroll 14.

The scroll 14 further converts the kinetic energy of the air flowing in from the diffuser 13 into the pressure energy and discharges it to the outside of the compressor casing 10. The air discharged through the scroll 14 is supplied to a cylinder or the like of an engine (not shown). The scroll 14 extends in the circumferential direction centering on the central axis C. A cross-sectional area of the scroll 14 thus formed gradually enlarges toward an outlet port (not shown) of the compressor P.

Figure 2:
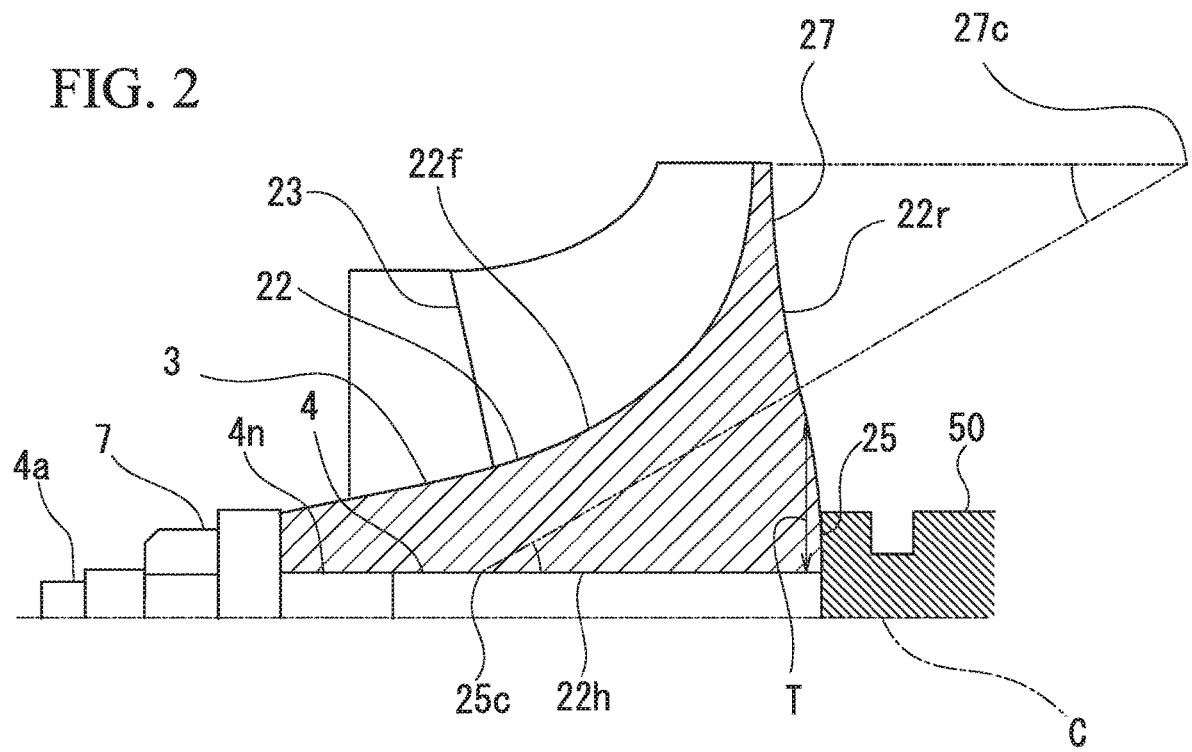
FIG. 2 is a cross-sectional view showing a shape of a rear surface of a disc of a compressor wheel provided in the turbocharger.

FIG. 2 is a cross-sectional view showing a shape of a rear surface 22r of the disc 22 of the compressor wheel 3.

As shown in FIG. 2, the disc 22 has the rear surface 22r on the second side in the central axis C direction. The rear surface 22r has a convex curved surface 25 which is convex toward the second side (the right side in FIGS. 1 and 2) in the central axis C in at least part thereof including the center portion of the disc 22. The convex curved surface 25 is formed on the rear surface 22r with a constant curvature radius centering on a position 25c offset to the disc surface 22f side on the first side (the right side in FIG. 2) in the central axis C direction.

Further, on the rear surface 22r, a concave curved surface 27 which is concave toward the second side (the right side in FIG. 2) in the central axis C direction is continuously formed on a radially outer side of the convex curved surface 25. The concave curved surface 27 is formed on the rear surface 22r with a constant curvature radius centering on a position 27c offset to the turbine T (refer to FIG. 1) side.

Such a compressor wheel 3 is provided so that the convex curved surface 25 of the rear surface 22r collides with the thrust collar 50.

According to the compressor wheel 3 and the turbocharger 1 of the above-described embodiment, when the convex curved surface 25 is formed at least in the center portion of the rear surface 22r of the disc 22 of the compressor wheel 3, it is possible to secure a large radial thickness T of the disc 22 at a portion on which the convex curved surface 25 is formed. Thus, strength of the disc 22 can be enhanced.

Further, the convex curved surface 25 can reduce a contact area with the thrust collar 50 which collides with the rear surface 22r of the disc 22, and thus local stress concentration at a contact portion with the thrust collar 50 can be prevented.

Also, the thickness of an outer circumferential portion of the disc 22 in the central axis C direction can be minimized by forming the concave curved surface 27 on an outer circumferential side of the convex curved surface 25, and a mass of the outer circumferential portion of the disc 22 can be minimized. Accordingly, it is possible to minimize centrifugal stress due to a weight of the disc 22.

In this way, it is possible to reduce the stress concentration on the rear surface 22r of the disc 22 and to improve reliability of the compressor wheel 3.

MODIFIED EXAMPLES OF THE EMBODIMENT

In the above-described first embodiment, the rear surface 22r of the disc 22 has the convex curved surface 25 formed at the center portion thereof and the concave curved surface 27 formed at the outer circumferential side. However, the present invention is not limited to such a constitution.

Hereinafter, a plurality of modified examples of the shape of the rear surface 22r of the disc 22 will be described.

First Modified Example

Figure 3:
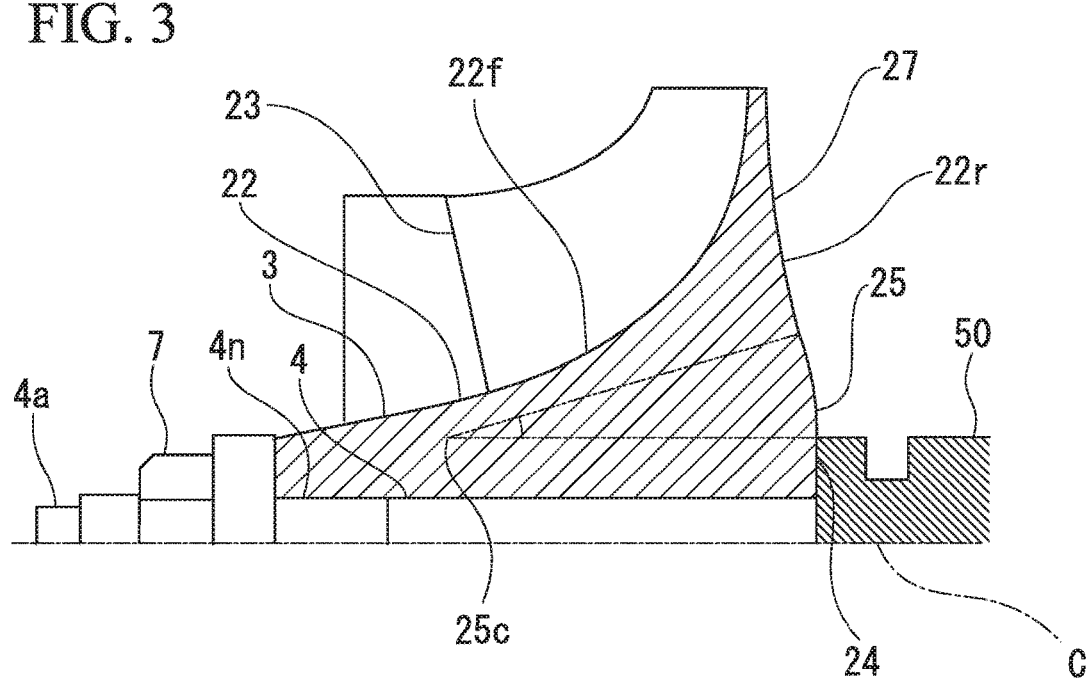
FIG. 3 is a cross-sectional view showing a first modified example of the shape of the rear surface of the disc of the compressor wheel.

FIG. 3 is a cross-sectional view showing a first modified example of the shape of the rear surface of the disc of the compressor wheel.

As shown in FIG. 3, a contact plane 24 which is in contact with the thrust collar 50 is formed in the center portion of the rear surface 22r of the c 22. The contact plane 24 is a plane orthogonal to the central axis C.

On the rear surface 22r of the disc 22, a convex curved surface 25 which is convex toward the second side (the right side in FIG. 4) in the central axis C direction is provided on an outer side of the contact plane 24 in the radial direction.

Further, on the rear surface 22r, a concave curved surface 27 which is convex toward the first side (the right side in FIG. 3) in the central axis C direction is continuously formed on an outer side of the convex curved surface 25 in the radial direction.

With such a configuration as well, the stress concentration on the rear surface 22r of the disc 22 can be reduced, and the reliability of the compressor wheel 3 can be enhanced.

Second Modified Example

Figure 4:
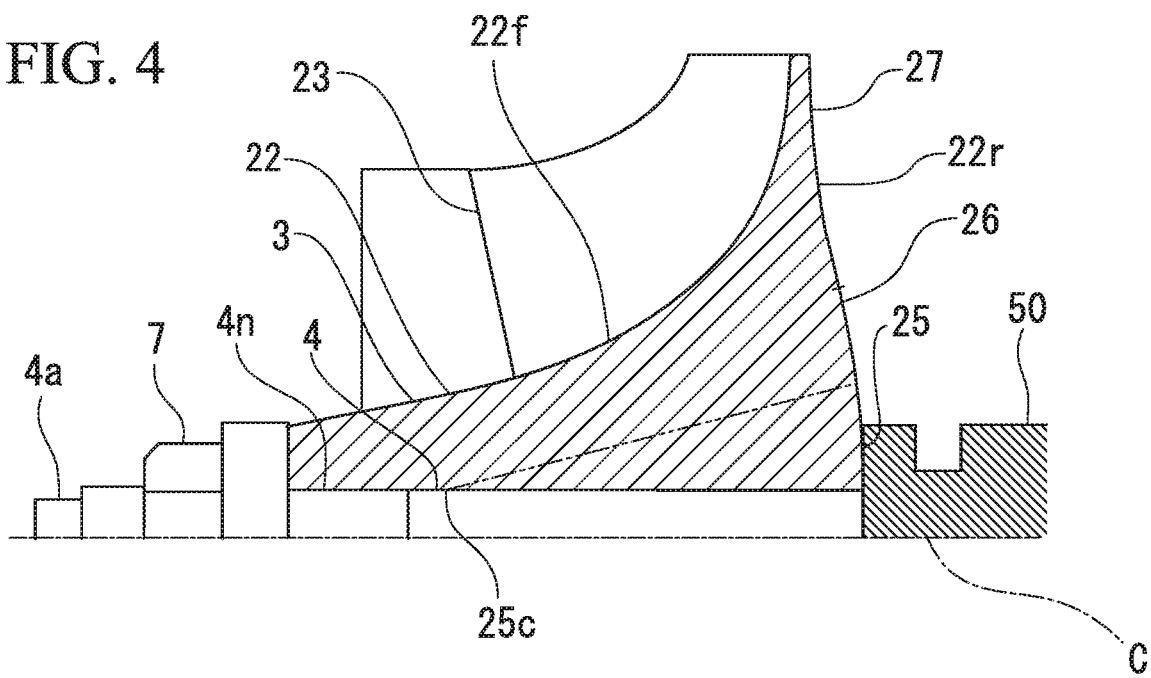
FIG. 4 is a cross-sectional view showing a second modified example of the shape of the rear surface of the disc of the compressor wheel.

FIG. 4 is a cross-sectional view showing a second modified example of the shape of the rear surface of the disc of the compressor wheel.

As shown in FIG. 4, the rear surface 22r of the disc 22 has a convex curved surface 25 which is convex toward the second side (the right side in FIGS. 1 and 2) in the central axis C direction at the center portion of the disc 22.

Further, the rear surface 22r has an outer circumferential convex curved surface 26 which is continuous with an outer side of the convex curved surface 25 in the radial direction, is convex toward the second side (the right side in FIG. 4) in the central axis C direction and is formed with a curvature different from that of the convex curved surface 25.

Furthermore, on the rear surface 22r, a concave curved surface 27 which is concave toward the second side (the right side in FIG. 4) in the central axis C direction is continuously formed on the outer side of the outer circumferential convex curved surface 26 in the radial direction.

With such a configuration as well, the stress concentration on the rear surface 22r of the disc 22 can be reduced, and the reliability of the compressor wheel 3 can be enhanced.

Third Modified Example

Figure 5:
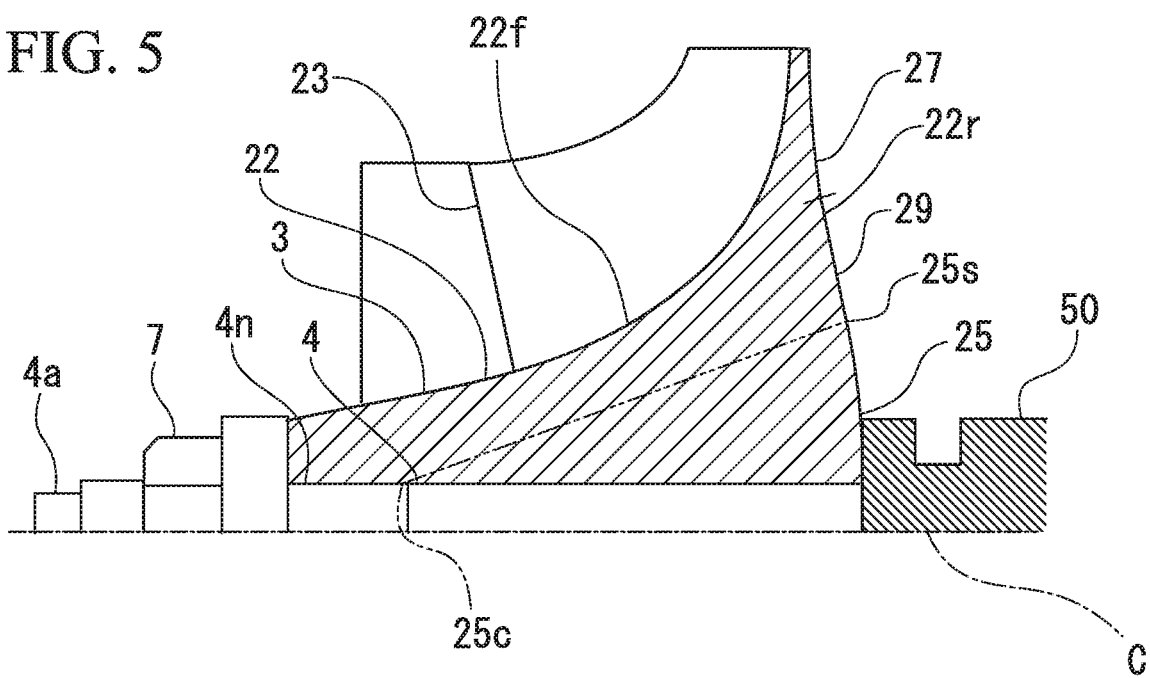
FIG. 5 is a cross-sectional view showing a third modified example of the shape of the rear surface of the disc of the compressor wheel.

FIG. 5 is a cross-sectional view showing a third modified example of the shape of the rear surface of the disc of the compressor wheel.

As shown in FIG. 5, the rear surface 22r of the disc 22 has a convex curved surface 25 which is convex toward the second side (the right side in FIG. 5) in the central axis C direction at the center portion of the disc 22.

Also, on the rear surface 22r, a tapered surface 29 which extends continuously from an outer circumferential end 25s of the convex curved surface 25 in a tangential direction is formed on an outer side of the convex curved surface 25 in the radial direction.

Furthermore, on the rear surface 22r, a concave curved surface 27 which is concave toward the second side (the right side in FIG. 5) in the central axis C direction is continuously formed on the outer side of the tapered surface 29 in the radial direction.

With such a configuration as well, the stress concentration on the rear surface 22r of the disc 22 can be reduced, and the reliability of the compressor wheel 3 can be enhanced.

Other Embodiments

The present invention is not limited to the above-described embodiment, and the design can be changed without departing from the scope of the present invention.

For example, the shape of the rear surface 22r of the disc 22 may be formed in shapes other than those exemplified in each of the above embodiment and modified examples. For example, the convex curved surface 25 can be formed not only with a constant curvature but also with a free curve, for example.

Further, for the shape of the convex curved surface 25 on the outer side of the center portion of the rear surface 22r in the radial direction, it is possible to have shapes other than those exemplified in each of the above embodiment and modified examples.

Further, for example, in the above-described embodiment, an open type impeller has been described as an example. However, the impeller is not limited to the open type impeller and may be a closed type impeller integrally including a cover portion, for example.

In addition, the turbocharger 1 was illustrated as the rotary machine. However, the rotary machine including the impeller is not limited to the turbocharger and may be a centrifugal compressor or the like, for example. Also, the present invention is also applicable to an electric compressor without a turbine.

INDUSTRIAL APPLICABILITY

The present invention can be applied to an impeller, a rotary machine, and a turbocharger. According to the present invention, it is possible to reduce the stress on the rear surface of the disc and to improve the reliability.

REFERENCE SIGNS LIST

1 Turbocharger (rotary machine)
2 Turbine wheel
2w Turbine blade
3 Compressor wheel (impeller)
4 Rotating shaft
4a First end
4b Second end
4d Stepped portion
4n Threaded portion
5A, 5B Bearing
6 Bearing housing
7 Nut
10 Compressor casing
11 Wheel inlet flow path
12 Wheel flow path
12a Outermost circumferential portion
13 Diffuser
14 Scroll
16 Bearing housing
22 Disc
22f Disc surface (surface)
22h Insertion hole
22r Rear surface
23 Blade
24 Contact plane
25 Convex curved surface
25c Position
25s Outer circumferential end
26 Outer circumferential convex curved surface
27 Concave curved surface
27c Position
29 Tapered surface
31 Turbine housing
31a Opening
32 Mounting fixture
33 Gas introduction portion
34 Scroll flow path
35 Exhaust portion
50 Thrust collar (collar)
51 Spacer
60a, 60b Opening
C Central axis
P Compressor
T Turbine

The invention claimed is:

1. A rotary machine comprising:
a rotating shaft which extends along a central axis; and
an impeller provided on the rotating shaft,
wherein the impeller comprising:
a disc provided on the rotating shaft; and
a plurality of blades provided on a surface of the disc on a first direction in a central axis direction,
wherein the plurality of blades are provided at intervals in a circumferential direction around the central axis,
wherein the disc includes a surface on a side opposite to the first direction in the central axis direction having a convex curved surface which is convex toward the side opposite to the first direction in the central axis direction,
wherein the convex curved surface has a shape being continuously and smoothly convex from an outer circumferential side of the disc toward the central axis,
wherein the rotary machine further comprises a collar provided on the rotating shaft, and wherein the collar is configured to contact with the convex curved surface at around the central axis.

2. The rotary machine according to claim 1, wherein an outer circumferential convex curved surface which is convex toward the second side in the central axis direction and is formed with a curvature different from that of the convex curved surface is continuously formed on an outer side of the convex curved surface in a radial direction.

3. The rotary machine according to claim 1, wherein a concave curved surface which is concave toward the second side in the central axial direction is continuously formed on an outer side of the convex curved surface in a radial direction.

4. The rotary machine according to claim 1, wherein an outer side of the convex curved surface in a radial direction has a tapered surface which extends continuously with the convex curved surface.

5. The rotary machine according to claim 1, wherein the impeller is provided with a concave curved surface provided in a radially outer side of the convex curved surface, the concave curved surface being concave toward the second side along the central axis direction.

6. The rotary machine according to claim 1, wherein a part of the surface of the disc on the side opposite to the first direction in the central axis direction, that is provided in the radially outer side of a contact area on which the convex curved surface contacts the collar, is provided at the side on the first direction in the central axis direction with respect to the contact area of the convex curved surface.

7. The rotary machine according to claim 1, wherein the convex curved surface has a constant curvature radius in a cross-sectional area including the central axis.

8. A turbocharger comprising:
a rotating shaft which extends along a central axis; and
an impeller provided on the rotating shaft,
wherein the impeller comprising:
a disc provided on the rotating shaft; and
a plurality of blades provided on a surface of the disc on a first direction in a central axis direction,
wherein the plurality of blades are provided at intervals in a circumferential direction around the central axis,
wherein the disc includes a surface on a side opposite to the first direction in the central axis direction having a convex curved surface which is convex toward the side opposite to the first direction in the central axis direction,
wherein the convex curved surface has a shape being continuously and smoothly convex from an outer circumferential side of the disc toward the central axis,
wherein the rotary machine further comprises a collar provided on the rotating shaft, and
wherein the collar is configured to contact with the convex curved surface at around the central axis.

* * * * *